United States Patent [19]

Kijima

[11] Patent Number: 4,892,350
[45] Date of Patent: Jan. 9, 1990

[54] AUTOMOBILE UNDERBODY STRUCTURE

[75] Inventor: Mitsutoshi Kijima, Iwakuni, Japan

[73] Assignee: Mazda Motor Corporation, Hiroshima, Japan

[21] Appl. No.: 227,249

[22] Filed: Aug. 2, 1988

[30] Foreign Application Priority Data

Aug. 4, 1987 [JP] Japan .............................. 62-119372[U]

[51] Int. Cl.⁴ .............................................. B62D 27/02
[52] U.S. Cl. .................................... 296/204; 296/194; 296/188
[58] Field of Search ................. 296/204, 194, 188, 185

[56] References Cited

U.S. PATENT DOCUMENTS

| | | | |
|---|---|---|---|
| 3,010,756 | 11/1961 | Barenyi | 296/204 |
| 3,285,653 | 11/1966 | Komenda | 296/204 |
| 3,321,235 | 5/1967 | Müller et al. | 296/204 |
| 3,940,176 | 2/1976 | Ito et al. | 296/188 |
| 4,014,587 | 3/1977 | Eggert, Jr. | 296/204 |
| 4,129,330 | 12/1978 | Schwuchow | 296/204 |
| 4,516,803 | 5/1985 | Kaltz | 296/194 |

FOREIGN PATENT DOCUMENTS 58-46668 9/1956 Japan .

*Primary Examiner*—Robert R. Song
*Attorney, Agent, or Firm*—Wenderoth, Lind & Ponack

[57] ABSTRACT

An automobile underbody structure includes a floor panel having a pair of longitudinal side edges, each extending longitudinally of the automobile body structure and having a respective side sill rigidly secured from below to the associated side edge so as to extend in a direction generally parallel to the longitudinal dimension of the automobile body structure. A pair of side frames are positioned between the opposite side sills and are secured from below to an undersurface of the floor panel so as to extend generally parallel to the side sills. Two sets of a plurality of generally elongated torque boxes, one set for each side of the floor panel, are secured to the undersurface of the floor panel so as to represent a generally closed cross-section in cooperation with the floor panel. Each set of the torque boxes so secured to the floor panel are spaced apart from each other in a direction longitudinally of the automobile body structure and are connected together by a connecting member secured to the respective set of the torque boxes and spaced from the floor panel.

6 Claims, 3 Drawing Sheets

AUTOMOBILE UNDERBODY STRUCTURE

BACKGROUND OF THE INVENTION

1. (Field of the Invention)

The present invention generally relates to an automobile underbody structure and, more particularly, to an underbody structure designed to substantially withstand a lateral impact applied to the automobile in a direction widthwise thereof.

2. (Description of the Prior Art)

It is quite well known that a floor panel forming the floor inside an automobile has a tunnel defined therein so as to protrude inwardly of the automobile compartment while extending longitudinally of the automobile for accommodating therebelow a rear end portion of a transmission and a drive shaft drivingly coupled with the transmission for the transmission of an engine drive to rear driven wheels. On opposite side edges of the floor panel are rigidly mounted side sills of generally polygonal cross-sectional shape extending longitudinally of the automobile, which side sills are positioned immediately below side access openings adapted to be selectively closed and opened by respective side door assemblies.

It is also well known that the floor panel is reinforced by longitudinal side frames each positioned between the tunnel and one of the side sills. Each of these longitudinal side frames has a generally U-shaped cross-section having a pair of flanges protruding laterally outwardly from the opposite side edges of the side frame, through which flanges the side frame is welded to the undersurface of the floor panel so as to extend in a direction longitudinally of the automobile.

Hitherto, numerous attempts have been made to increase the rigidity of the automobile underbody structure against any possible impact which would be applied thereto in the event of, for example, a side collision, i.e., the collision of one automobile against a different automobile in a direction laterally thereof, and/or to minimize the transmission of shocks or vibrations from the wheels to the automobile body which would occur in the event that the automobile is used in an off-road environment. One such attempt includes the use of so-called torque boxes secured from below to the floor panel at a front portion thereof, one floor torque box being positioned on each side of the tunnel in the floor panel.

The torque box referred to above is a reinforcement member of generally U-shaped cross-section having a pair of flanges protruding laterally outwardly from the opposite side edges thereof and secured rigidly through the flanges to the undersurface of a front end portion of the floor panel so as to connect the associated side frame and the associated side sill together while defining a generally closed cross-section between it and the floor panel.

Japanese Laid-open Utility Model Publication No. 58-46668, published in 1983, discloses one approach to increase the rigidity of the automobile underbody structure against lateral impact for the purpose of minimizing damage which passengers may suffer in the even of a side collision. According to this publication, the floor panel has rear risers for the connection thereto of legs of a front seat assembly, of which are secured to opposite lateral walls of the tunnel and the remaining two of which are secured in part to the floor panel and in part to the respective side sills. The rear risers adjacent the opposite side edges of the floor panel are positioned generally below center pillars on respective sides of the automobile body structure, each such center pillar separating a respective front side access opening from an adjacent rear side access opening.

The automobile underbody structure disclosed in this publication makes use of a sub-cross member secured from below to the undersurface of the floor panel and connected at one end to a portion of each side edge of the floor panel immediately beneath the associated rear riser and at the opposite end to the adjacent longitudinal side frame.

This prior art approach such as exemplified by the above discussed Japanese publication has been found inapplicable to an automobile of a convertible type, i.e., a model not having a rigid roof. More specifically, in the convertible model, since the automobile body structure does not include a rigid roof, the rigidity of the automobile body structure as a whole is low compared with a normal automobile body structure having a rigid roof. Therefore, the automobile body structure for a convertible model is relatively apt to bend or twist under the influence of vibrations induced in the automobile body structure during operation thereof and/or lateral forces such as occur during cornering. Accordingly, with the prior art approach, there often are found problems associated with the lack of sufficient rigidity of the automobile front underbody structure.

Also, it is well-known that side door assemblies are generally hingedly connected to respective hinge pillars, each extending upwardly from a front end of the associated side sill, for selectively closing and opening the associated side access openings. Considering this very usual practice to connect the side door assemblies to the hinge pillars, the convertible model requires that each hinge pillar have an increased rigidity.

Furthermore, in the convertible model, vibrations transmitted from the automobile power plant, for example, the engine, to the automobile body structure tend to act on the automobile body structure so as to twist the latter and, consequently, resonant vibrations may occur inside the passenger compartment.

The above discussed problems may be substantially eliminated if the floor panel, or at least the front end portion of the floor panel, and members surrounding the floor panel are made of plate material having a substantial thickness. However, an increase of the thickness of the floor panel and the associated members may bring about other problems, for example, increased weight of the automobile body structure, increased manufacturing cost, increased fuel consumption and lowered acceleration performance.

SUMMARY OF THE INVENTION

Accordingly, the present invention has been devised with a view to substantially eliminating the above discussed problems inherent in the prior art automobile underbody structure and has for its essential object to provide an improved automobile underbody structure effective to increase the rigidity of not only the floor panel, but also other members surrounding the floor panel.

To this end, the present invention provides an improved automobile underbody structure which comprises a floor panel having a pair of longitudinal side edges, each extending longitudinally of the automobile body structure and having a respective side sill rigidly secured to the associated side edge so as to extend in a direction generally parallel to the longitudinal dimension of the automobile body structure, and a pair of side frames positioned between the opposite side sills and secured from below to an undersurface of the floor panel so as to extend generally parallel to the side sills. Two sets of a plurality of generally elongated torque boxes, one set employed for each side of the floor panel, are secured to the undersurface of the floor panel so as to represent a generally closed cross-section in cooperation with the floor panel. The torque boxes of each set so secured to the floor panel are spaced apart from each other in a direction longitudinally of the automobile body structure and are connected together by means of a connecting member secured to the torque boxes of the respective set and spaced from the floor panel.

BRIEF DESCRIPTION OF THE DRAWINGS

This and other objects and features of the present invention will become clearly understood from the following description of a preferred embodiment thereof with reference to the accompanying drawings, in which.

DETAILED DESCRIPTION OF THE EMBODIMENT

Figure 1:
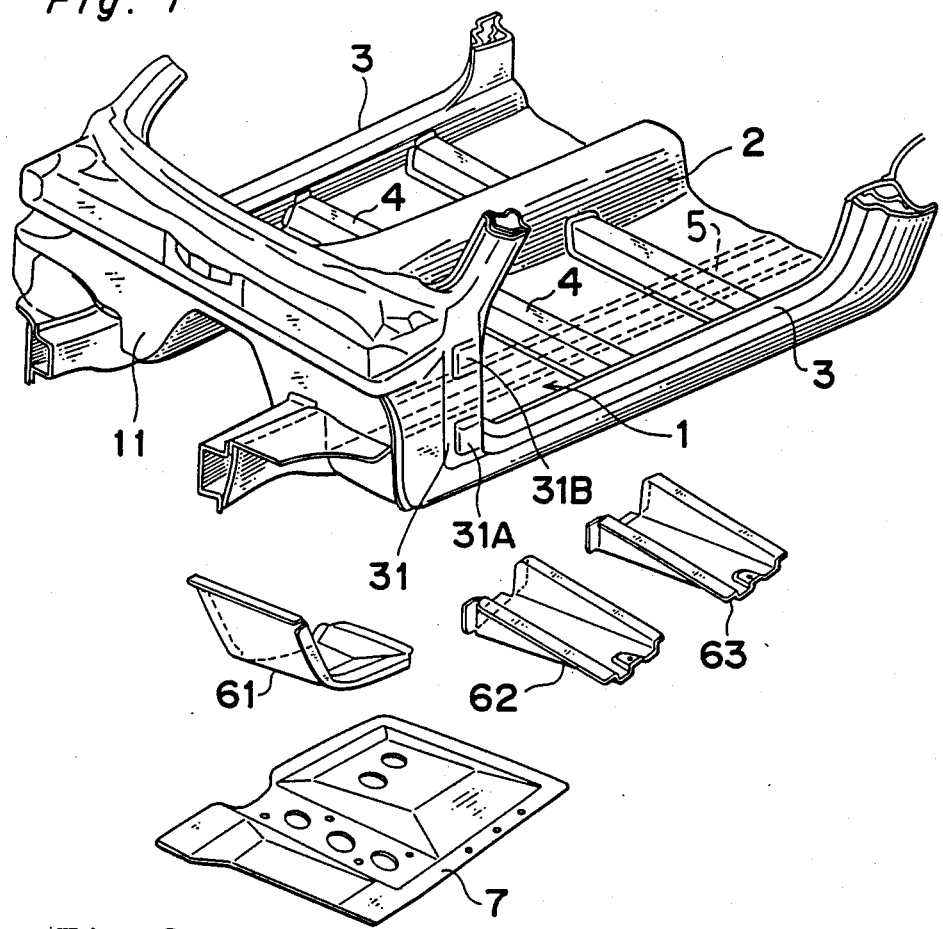
FIG. 1 is a fragmentary exploded view of an automobile underbody structure embodying the present invention.
Figure 2:
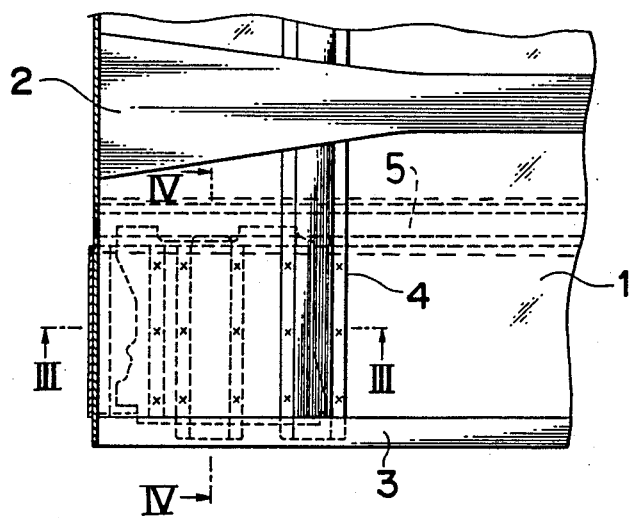
FIG. 2 is a schematic top plan view of the automobile underbody structure shown in FIG. 1.

FIG. 1 illustrates, in exploded representation, an automobile front underbody structure according to a preferred embodiment of the present invention which is utilizable in an automobile convertible model. Referring now to the the accompanying drawings, the front underbody structure shown therein comprises a floor panel 1 of generally rectangular shape having a pair of opposite side edges and also having a tunnel 2 defined intermediate of the opposite side edges and protruding upwardly into a passenger's compartment for accommodating therebelow a rear end portion of a transmission (not shown) and a drive shaft (not shown) drivingly coupled with the transmission for the transmission of an engine drive to rear driven wheels.

A side sill 3 of generally polygonal closed cross-section is rigidly welded to each of the opposite side edges of the floor panel 1 so as to extend in a direction longitudinally of the floor panel 1 thereby to impart rigidity to the respective side edge of the floor panel. The side sill 3 for each side edge of the floor panel 1 has a front end portion rigidly connected with a respective hinge pillar 31 extending generally upwardly and generally perpendicular to the side sill 3. The hinge pillar 31 has an outer lateral side face to which a pair of hinge members 31A and 31B are rigidly secured for pivotal connection with an associated front side door assembly (not shown). A bulkhead 11 used to separate the passenger compartment from an engine compartment is positioned frontwardly of the opposite hinge pillars 31 and has a pair of opposite ends rigidly secured to the respective hinge pillars 31 and also has a lower edge portion rigidly welded to a front end of the floor panel 1.

A pair of cross members 4 each having a cross-sectional shape similar to that of a steel hat are positioned on respective sides of the tunnel 2 and rigidly mounted on an upper surface of the floor panel so as to extend in a direction transversely of the longitudinal dimension of the tunnel 2, each of the cross members 4 being welded at one end to the adjacent side sill 3 and at the opposite end to the adjacent lateral wall portion of the tunnel 2.

Positioned between the tunnel 2 and each of the side sills 3 and secured to an undersurface of the floor panel 1 so as to extend generally parallel to the longitudinal dimension of the tunnel 2 is a side frame 5 having a cross-sectional shape similar to that of a steel hat. It is to be noted that the cross members 4 and the side frames 5 generally perpendicular to the cross members 4 provide a reinforcement to the floor panel 1.

Figure 3:
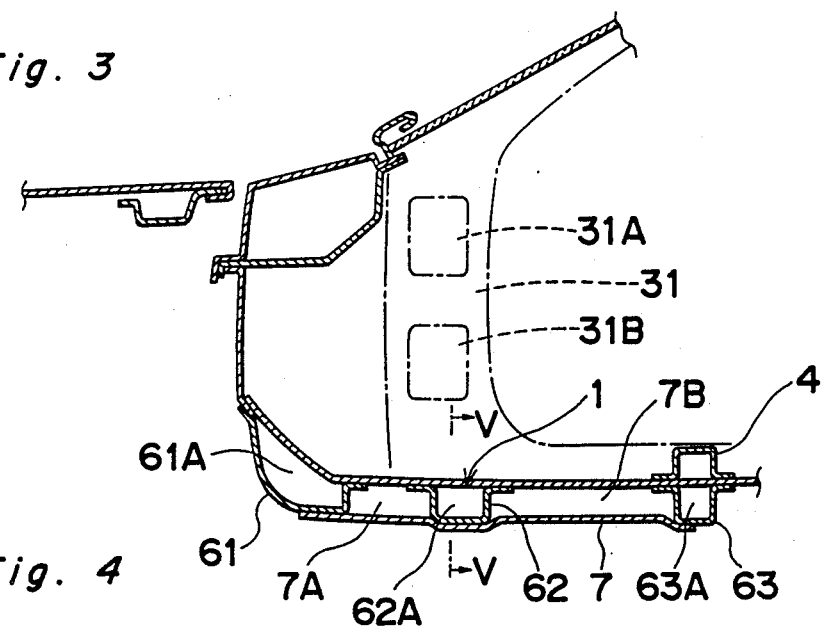
FIG. 3 is a cross-sectional view taken along the line III—III in FIG. 2.
Figure 4:
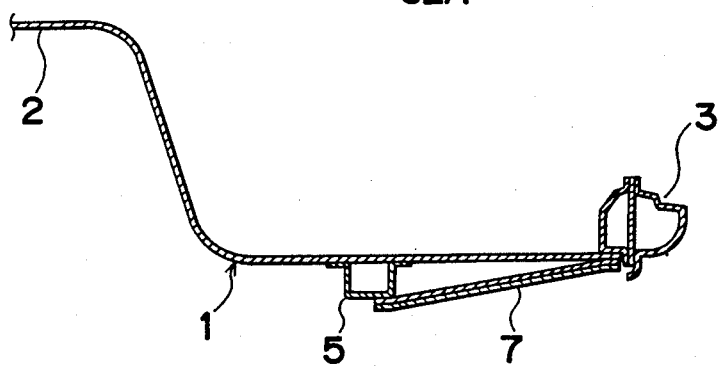
FIGS. 4 and 5 are cross-sectional views, on an enlarged scale, taken along the line IV—IV in FIG. 2 and the line V—V in FIG. 3, respectively.
Figure 5:
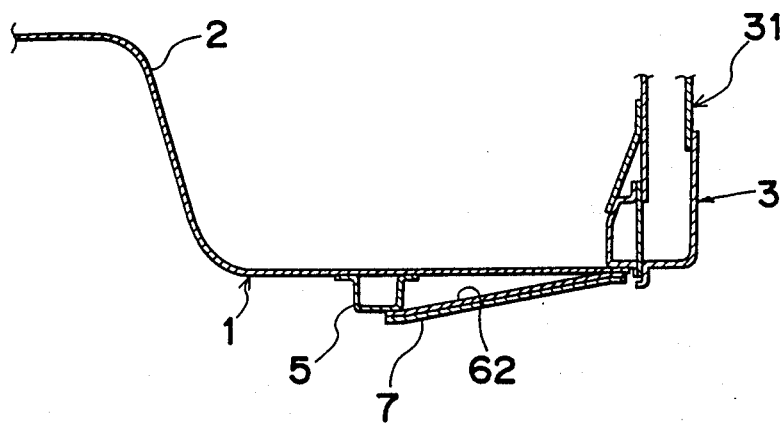

In accordance with the present invention, for each side of the floor panel 1, a plurality of, for example, three, torque boxes 61, 62 and 63 are employed as best shown in FIG. 1. As best shown in FIGS. 3 to 5, each of the torque boxes 61 to 63 having a cross-sectional shape generally similar to that of a steel hat is secured from below to the undersurface of the floor panel 1 so as to extend transversely between each side sill 3 and the adjacent side frame 5, thereby to define a generally closed hollow space in cooperation with the floor panel 1, the side sill 3 and the side frame 5.

In particular, referring to FIG. 3, the torque box 61 is positioned generally below the bulkhead 11 so as to straddle the joint between the bulkhead 11 and the floor panel 1 with a generally closed hollow space 61A defined between the torque box 61, the bulkhead 11 and the floor panel 1. The torque box 62 located rearwardly of the torque box 61 with respect to the automobile body structure is positioned immediately below the associated hinge pillar 31 while defining a generally closed hollow space 62A in cooperation with the floor panel 1. The torque box 63 located on side of the torque box 62 remote from the torque box 61 is positioned immediately beneath the associated cross member 4.

These torque boxes 61 to 63 for each side of the floor panel 1 are connected together by means of a reinforcement plate 7 rigidly secured from below to the torque boxes 61 to 63 so as to define a generally closed hollow space 7A between the torque boxes 61 and 62 and, also, a generally closed hollow space 7B between the torque box 62 and 63.

Thus, it is clear that the torque boxes 61 to 63 for each side of the floor panel 1 serve as respective braces capable of exhibiting physical strength which would be exhibited by braces if the latter have a thickness corresponding to the height of each torque box 61 to 63 defined between the floor panel 1 and the reinforcement plate 7.

In other words, by the employment of the torque boxes 61 to 63, at least the front end portion of the floor panel 1 can have a rigidity comparable to that exhibited thereby when the front end portion of the floor panel 1 is of a substantial thickness. In addition to the increased rigidity achieved by the employment of the torque boxes 61 to 63, the presence of the closed hollow spaces 7A, 7B, 61A, 62A and 63A makes it possible to minimize the increase of the weight of automobile body structure as a whole.

In general, where the automobile employing the front underbody structure is a convertible model, such automobile does not include rigid roof. Therefore, the automobile body structure as a whole tends to be adversely affected by bending forces and/or torsional forces acting thereon under the influence of vibrations induced during operation thereof and/or the lateral forces such as occur during cornering, to such an extent that a stresses may occur in the front end portion of the floor panel 1. However, according to the present invention, the front end portion of the floor panel 1 has imparted thereto a rigidity substantially sufficient to withstand such stresses because of the reinforcement formed by the use of the torque boxes 61 to 63 in combination with the reinforcement plate 7.

Moreover, according to the present invention, since the torque box 62 is secured from below to the floor panel 1 at a location immediately beneath the associated hinge pillar 31, with the torque boxes 61 and 63 positioned on respective sides thereof, the front end portion of the floor panel 1 below each hinge pillar 31 is in reality reinforced. This is particularly advantageous where the automobile is a convertible model wherein the absence of a rigid roof tends to reduce the rigidity of each of the hinge pillars, because the use of the torque boxes 61 to 63 in combination with the reinforcement plate 7 according to the present invention can also reinforce indirectly the respective hinge pillar. Therefore, the present invention will not cause a passenger or passengers in the automobile utilizing the front underbody structure according to the present invention to feel, because of the absence of a rigid roof, as if the convertible was pliable during the selective closure and opening of the side door assembly.

Also, the transmission of vibrations from the automobile power plant to the passenger compartment can be advantageously minimized because the front end portion of the floor panel immediately behind the engine compartment is reinforced by the formation of the generally closed hollows effective to absorb the vibrations, thereby to lessen the transmission of the vibrations to the passenger compartment.

Figure 6:
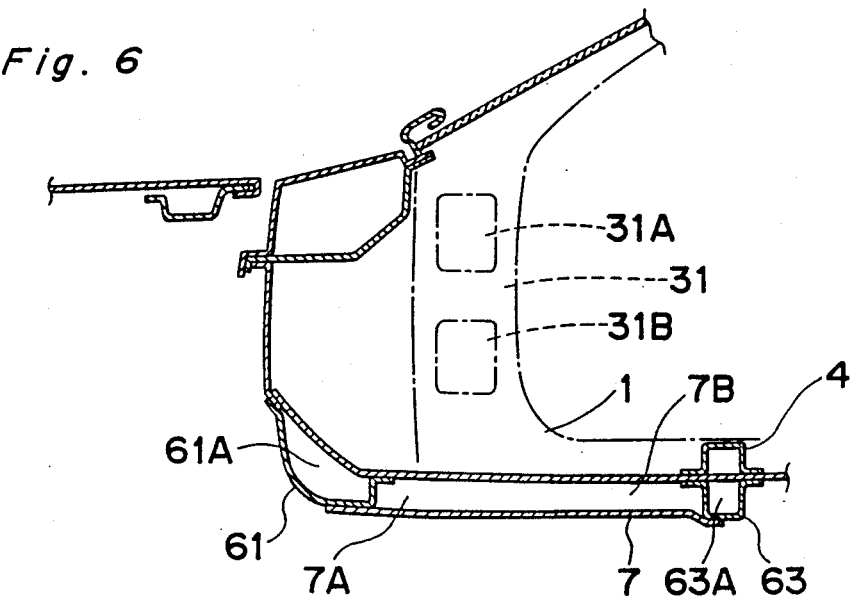
FIG. 6 is a view similar to FIG. 3, showing a modified form of the automobile underbody structure.

Although the present invention has been fully described in connection with the preferred embodiment thereof with reference to the accompanying drawings, it is to be noted that various changes and modifications are apparent to those skilled in the art without departing from the true scope thereof as defined by the appended claims. By way of example, although reference has been made to the use of the three torque boxes, the number of the torque boxes useable according to the present invention is not always limited to three such as shown and described. Rather, the use of at least two may be sufficient, and one of the torque boxes, such as torque box 62, may be dispensed with, as shown in FIG. 6.

Accordingly, such changes and modifications are to be construed as included within the true scope of the present invention.

I claim:

1. An automobile underbody structure comprising:
   a floor panel having a pair of longitudinal side edges, each said side edge extending in a direction to be longitudinally of an automobile body structure;
   a pair of side sills, each said side sill being rigidly secured to a respective said side edge so as to extend in a direction generally parallel to the longitudinal dimension of the automobile body structure;
   a pair of side frames positioned between said side sills and secured from below to an undersurface of said floor panel so as to extend generally parallel to said side sills;
   two sets of a plurality of generally elongated torque boxes, one said set for each side of said floor panel, said torque boxes of each said set being secured to said undersurface of said floor panel so as to define generally closed hollow spaces in cooperation with said floor panel, said torque boxes of each said set being spaced apart from each other in a direction longitudinally of the automobile body structure; and
   a reinforcement plate member secured to said torque boxes of each said set and spaced from said floor panel.

2. The automobile underbody structure as claimed in claim 1, wherein said floor panel has a tunnel defined therein at a position intermediate of the width thereof, and wherein each of said side frames is positioned between said tunnel and a respective said side sill.

3. The automobile underbody structure as claimed in claim 2, wherein each said set of torque boxes includes two said torque boxes spaced apart from each other in a direction generally parallel to the longitudinal dimension of the automobile body structure and defining a single closed hollow space in cooperation with said reinforcement plate member and said floor panel.

4. The automobile underbody structure as claimed in claim 2, further comprising a bulkhead having a lower edge rigidly secured to said side sills and extending upwardly and generally perpendicular to said side sills so as to separate a passenger compartment from an engine compartment, and wherein one of said torque boxes of each said set closest to said bulkhead is positioned so as to cover the joint between said lower edge of the bulkhead and the respective said side sill.

5. The automobile underbody structure as claimed in claim 4, wherein each said set of torque boxes includes three said torque boxes spaced apart from each other in a direction generally parallel to the longitudinal dimension of the automobile body structure.

6. The automobile underbody structure as claimed in claim 5, wherein one of said torque boxes of each said set positioned intermediate of the other two torque boxes of said each set is located immediately beneath a hinge pillar extending upwardly from the respective said side sill.

* * * * *